United States Patent
Nguyen et al.

(10) Patent No.: US 10,469,781 B1
(45) Date of Patent: Nov. 5, 2019

(54) POWER DISTRIBUTION NETWORK ADAPTED FOR IMAGING ARRAYS

(71) Applicant: BAE Systems Imaging Solutions Inc., San Jose, CA (US)

(72) Inventors: Khai Nguyen, Stockton, CA (US); Peter Bartkovjak, San Jose, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 0 days.

(21) Appl. No.: 16/212,325

(22) Filed: Dec. 6, 2018

(51) Int. Cl.
 *H04N 5/369* (2011.01)
 *H04N 5/3745* (2011.01)
 *H04N 5/378* (2011.01)

(52) U.S. Cl.
 CPC ......... *H04N 5/3698* (2013.01); *H04N 5/3745* (2013.01); *H04N 5/378* (2013.01)

(58) Field of Classification Search
 CPC .... H04N 5/3698; H04N 5/3745; H04N 5/378; H04N 5/3355; H04N 5/341; H04N 5/217; H04N 5/345; H04N 3/155; H04N 3/1575; H04N 3/1526
 USPC ........ 348/294–324; 250/208.1; 257/290–292
 See application file for complete search history.

(56) References Cited

U.S. PATENT DOCUMENTS

| | | | | |
|---|---|---|---|---|
| 2007/0247535 A1* | 10/2007 | Yoshida | ................... | H03F 3/082 348/294 |
| 2009/0009635 A1* | 1/2009 | Maeda | ................... | H04N 5/351 348/241 |
| 2018/0367749 A1* | 12/2018 | Miyoshi | ............ | H01L 27/14603 |

* cited by examiner

*Primary Examiner* — Yogesh K Aggarwal
(74) *Attorney, Agent, or Firm* — Calvin B. Ward (57) ABSTRACT

A power distribution network is disclosed. The power distribution can be applied to imaging arrays and other circuits that include a large number of conductors that must be driven such that the conductors are biased such that substantially the same current flows in each conductor. The power distribution network includes a plurality of bit lines and a first power connection network. Each bit line is connected to a different location on a first power bus, which is divided into a plurality of first conducting segments. Each first conducting segment is connected to a plurality of the bit lines. Each bit line includes a constant current source that causes a bias current to flow in the bit line and through the first power bus. The first power connection network includes a plurality of conducting paths that connect a corresponding one of the first conducting segments to a first power rail.

12 Claims, 8 Drawing Sheets

POWER DISTRIBUTION NETWORK ADAPTED FOR IMAGING ARRAYS

BACKGROUND

As integrated circuit geometries associated with CMOS imaging arrays continue to shrink, power distribution presents significant challenges. Typically, the CMOS imaging array is organized as a rectangular array of rows and columns of pixel sensors. During readout, all of the pixel sensors in a given row are read out in parallel by column processing circuitry. There are thousands of such columns, and the voltages on each column and the bias currents through the bit lines must be the same. As the feature size is reduced, the voltages that can be used to operate the CMOS array must also be reduced. In addition, the sizes of conductors that distribute the power must be reduced. The reduced conductor sizes make it difficult to maintain constant voltages across all of the columns when current is flowing.

SUMMARY

This disclosure broadly includes a power distribution network. The power distribution can be applied to imaging arrays and the like, as well as other circuits that include a large number of conductors that must be driven such that the conductors are biased such that substantially the same current flows in each conductor. The power distribution network includes a plurality of bit lines and a first power connection network. Each of the plurality of bit lines is connected to a different location on a first power bus, the first power bus being divided into a plurality of first conducting segments. Each of the plurality of first conducting segments is connected to a plurality of the bit lines. Each bit line includes a constant current source that causes a bias current to flow in the bit line and through the first power bus. The first power connection network includes a plurality of conducting paths, one of the conducting paths connecting a corresponding one of the first conducting segments to a first power rail and being characterized by a path resistance that is greater than a critical impedance.

In one aspect, the power distribution network includes an imaging array having a plurality of columns of pixel sensors, each pixel sensor in one of the columns is connected to one of the bit lines that is shared by all pixel sensors in that column.

In another aspect, the path resistances are substantially equal to one another.

In another aspect, the first power connection network includes a tree-configured network having a leaf node connected to one of the plurality of first conducting segments and a root node connected to the first power rail.

In another aspect, the pixel sensors are part of a semiconductor wafer underlying a plurality of metal layers and wherein the first power connection network includes conductors in a plurality of the metal layers.

In another aspect, the power distribution network includes a calibration current path which includes a master current source that generates a calibration current in the first half of a current mirror, the constant current source in the bit lines includes a second half of the current mirror.

In another aspect, the calibration current path includes a compensation resistor in series with the first half of the current mirror, the compensation resistor compensating for the path resistance.

In another aspect, the compensation resistor has a resistance chosen such that a voltage drop over the compensation resistor is substantially equal to a voltage drop over the path resistance when a current flows in the first half of the current mirror.

In another aspect, each of the bit lines includes a first power connection connected to the first power bus and a second power connection at a different location on that bit line than the first power connection, the second power connection is connected to a second power bus divided into a plurality of second conducting segments, the apparatus further includes a second power connection network which includes a plurality of conducting paths connecting a corresponding one of the second conducting segments to a second power rail and is characterized by a path resistance that is greater than a critical impedance.

In another aspect, the conducting paths of the second power connection network are substantially equal to one another.

In another aspect, the second power rail has a voltage that compensates for a voltage drop through the second power connection network due to the bias currents in the bit lines.

DETAILED DESCRIPTION

Figure 1:
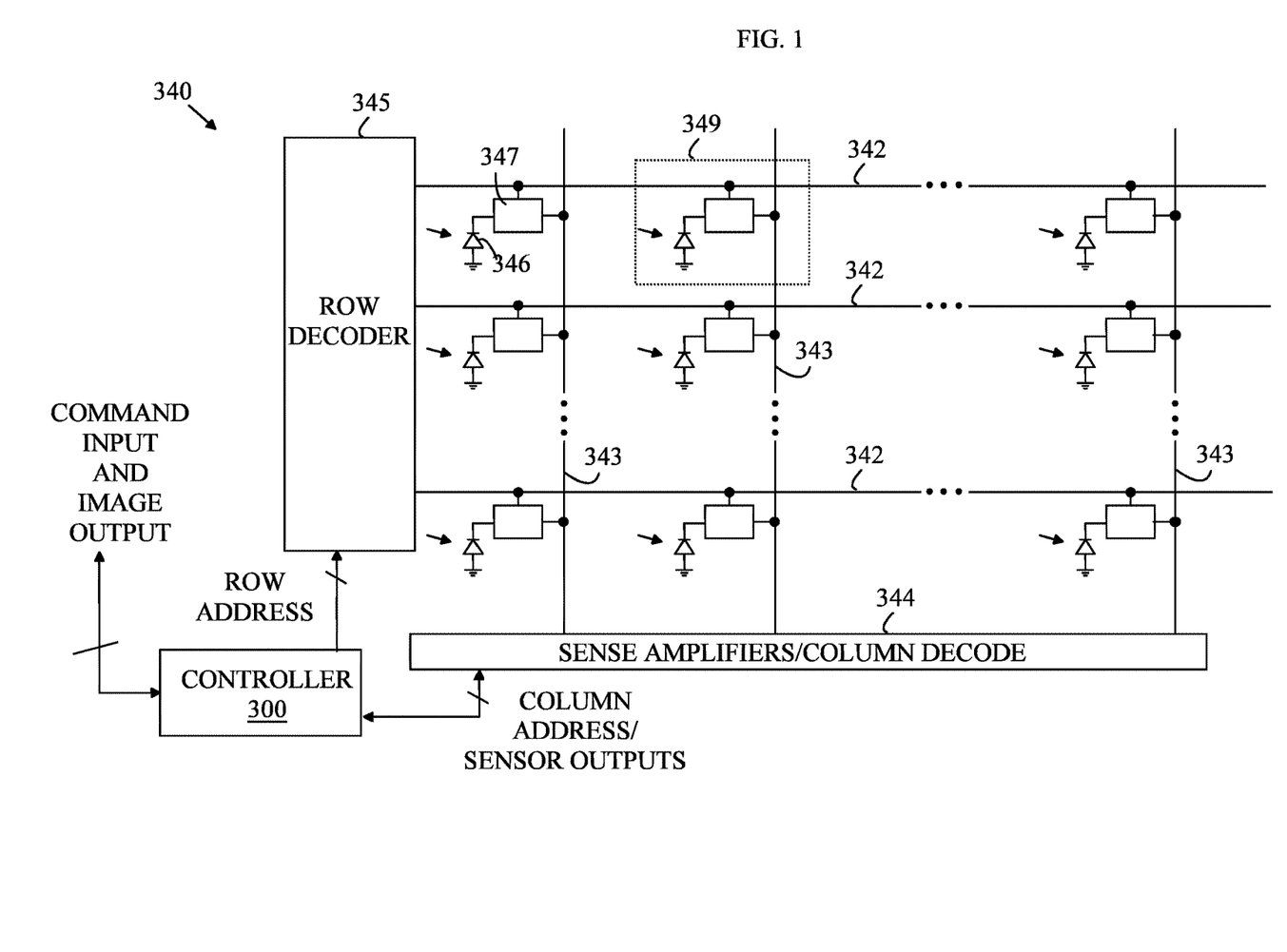
FIG. 1 is a schematic drawing of one embodiment of a CMOS imaging array.

Refer now to FIG. 1, which is a schematic drawing of one embodiment of a CMOS imaging array. Imaging two-dimensional pixel array 340 is constructed from a rectangular array of pixel sensors 349. Each pixel sensor includes a photodiode 346 and an interface circuit 347. The details of the interface circuit depend on the particular pixel design. However, all of the pixel sensors include a gate that is connected to a row line 342 that is used to connect that pixel sensor to a bit line 343. The specific row that is enabled at any time is determined by a row address that is input to a row decoder 345. The row select lines are a parallel array of conductors that run horizontally in the metal layers over the substrate in which the photodiodes and interface circuitry are constructed.

Each of the bit lines terminates in a column processing circuit 344 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel sensor is read out from the imaging array. The specific column that is read out is determined by a column address that is utilized by a column decoder to connect the sense amplifier/ADC output from that column to circuitry that is external to the imaging array. The sequencing of the control signals and other functions are performed by a controller 300. To simplify the drawings, the connections between controller 300 and the various control lines have been omitted from the drawing.

Figure 2:
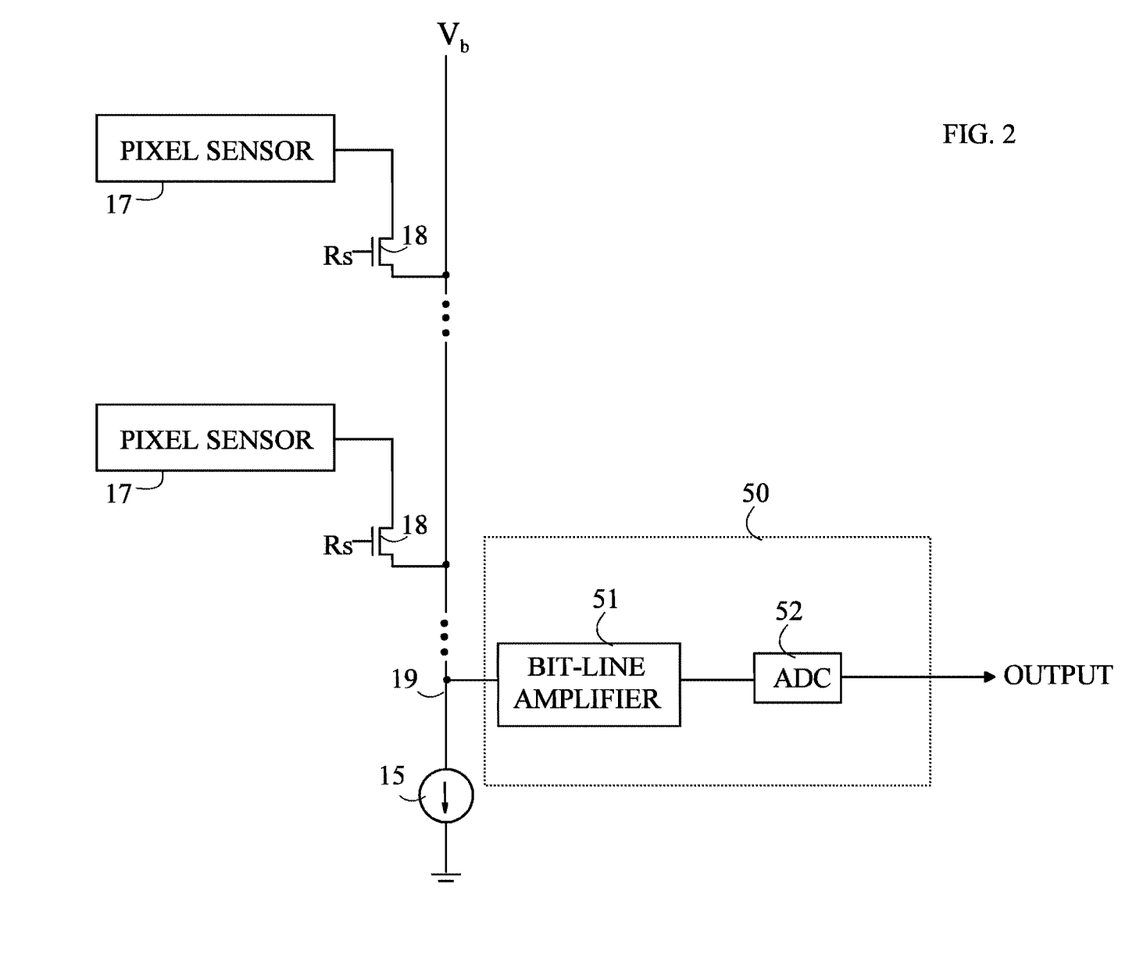
FIG. 2 illustrates one column of an imaging array such as shown in FIG. 1 in more detail.

Refer now to FIG. 2, which illustrates one column of an imaging array such as shown in FIG. 1 in more detail. All of the pixels in any given column are connected to a common bit line 19. Each pixel sensor 17 is connected to bit line 19 by a row gate 18 which is controlled by a row select signal. All pixel sensors in a given row are connected to the same row select line. At any given time only one pixel sensor is connected to bit line 19. The signals on bit line 19 are processed by a column processing circuit 50 which typically includes a bit line amplifier 51 and then ADC circuit 52. ADC circuit 52 may also include a number of sample and hold circuits which are used during the readout process.

The bit lines have a high capacitance, and hence, the bias current needed to drive the thousands of bit lines and the associated circuitry is significant. During the readout of the pixel sensors currently attached to bit line 19, bit line 19 must be biased with a constant current source 15. Typically, constant current source 15 is one half of a current mirror. Providing the same bias current in each bit line presents significant challenges because of a finite resistivity of the metal lines in the integrated circuit in which the imaging array is constructed.

Figure 3:
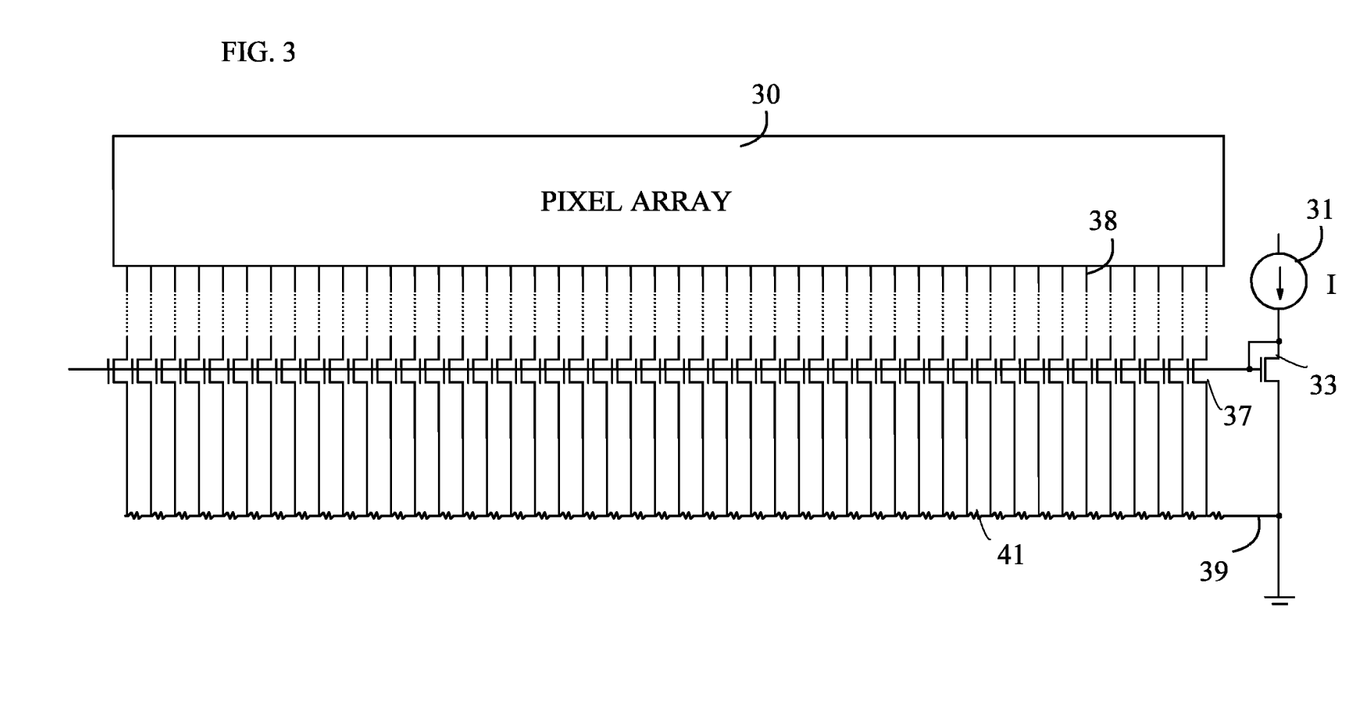
FIG. 3 illustrates a bit line biasing scheme that utilizes current mirrors for the constant current sources shown in FIG. 2.

Refer now to FIG. 3, which illustrates a bit line biasing scheme that utilizes current mirrors for the constant current sources shown in FIG. 2. The imaging system includes a two-dimensional pixel array 30 that is organized into a plurality of rows and columns as discussed above. Each column includes a bit line such as bit line 38. The constant current source in each bit line is implemented by including a bit line FET such as FET 37 in each bit line. Each of these embedded FETs forms one half of a current mirror with that FET having its gate connected to its source as shown at 33. FET 33 is connected in series with constant current source 31. Each bit line FET is connected to a conductor 39 that is connected to a ground terminal. To simplify the following discussion, the current path that includes constant current source 31 and FET 33 will be referred to as a "current master". The other half of the current mirror, i.e., FET 37, will be referred to as a mirrored current path.

Conductor 39 is implemented in one or more of the metal lines overlying the integrated circuit substrate. The conductor segments between each of the bit line connections have a finite resistivity as indicated by resistor 41. Since there are thousands of such bit lines, the difference in resistance between the FETs that are farthest from the ground terminal and the bit lines that are closest to the ground terminals can pose significant problems.

Figure 4:
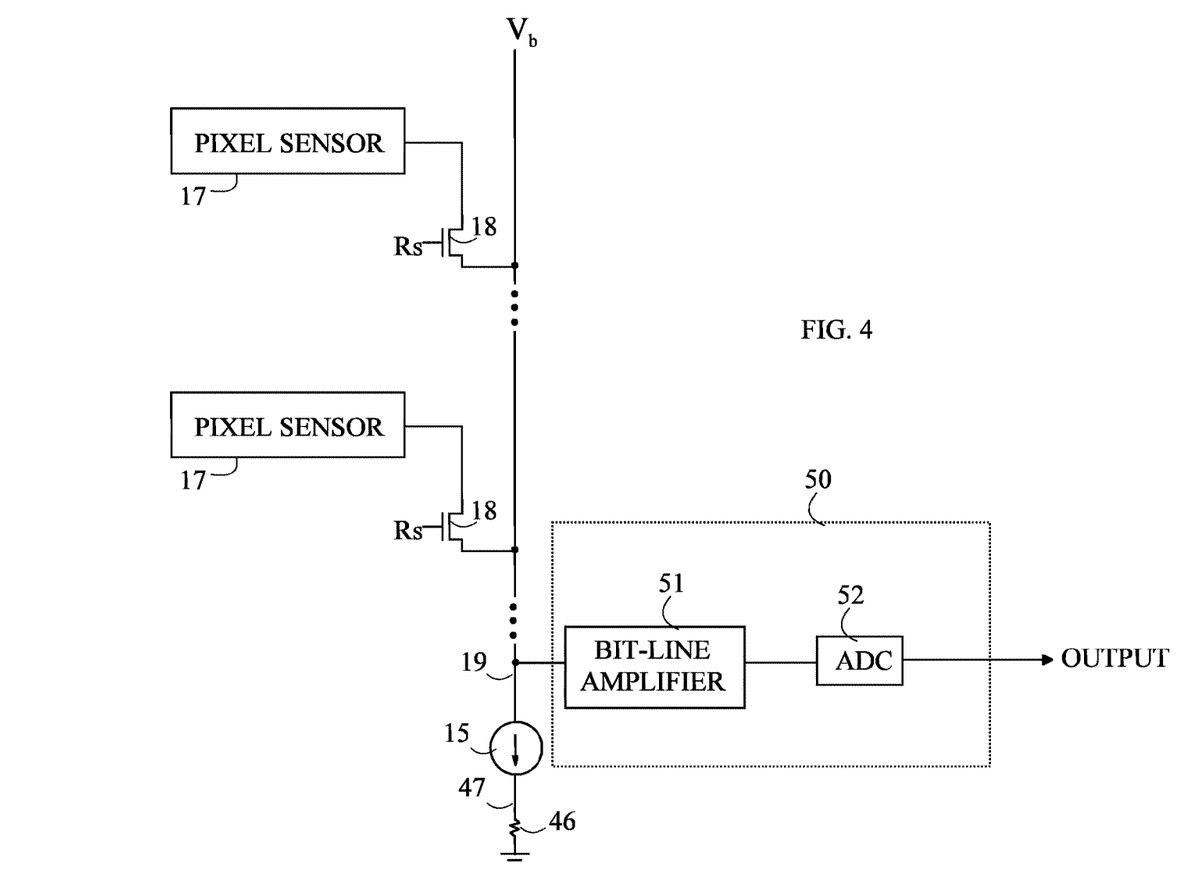
FIG. 4 illustrates the column processing circuitry shown in FIG. 2 with the resistance from the resistors 41 shown at 46.

Refer now to FIG. 4, which illustrates the column processing circuitry shown in FIG. 2 with the resistance from the resistors 41 shown at 46. The current from constant current source 15, i.e., the mirrored current path, raises the potential at node 47 above ground by an amount that depends on the resistance of resistor 46. This increase in the potential at node 47 causes two problems. First, the maximum photocharge that can be readout from the pixel sensors is reduced by the increased potential at node 47. Second, the value of resistor 46 varies as a function of the position of the bit line 19 in the array of bit lines. Hence, the maximum photocharge that can be measured varies from column to column. Accordingly, a scheme for reducing the variation in resistor 46 from column to column as well as the resistance of resistor 46 is needed.

Figure 5:
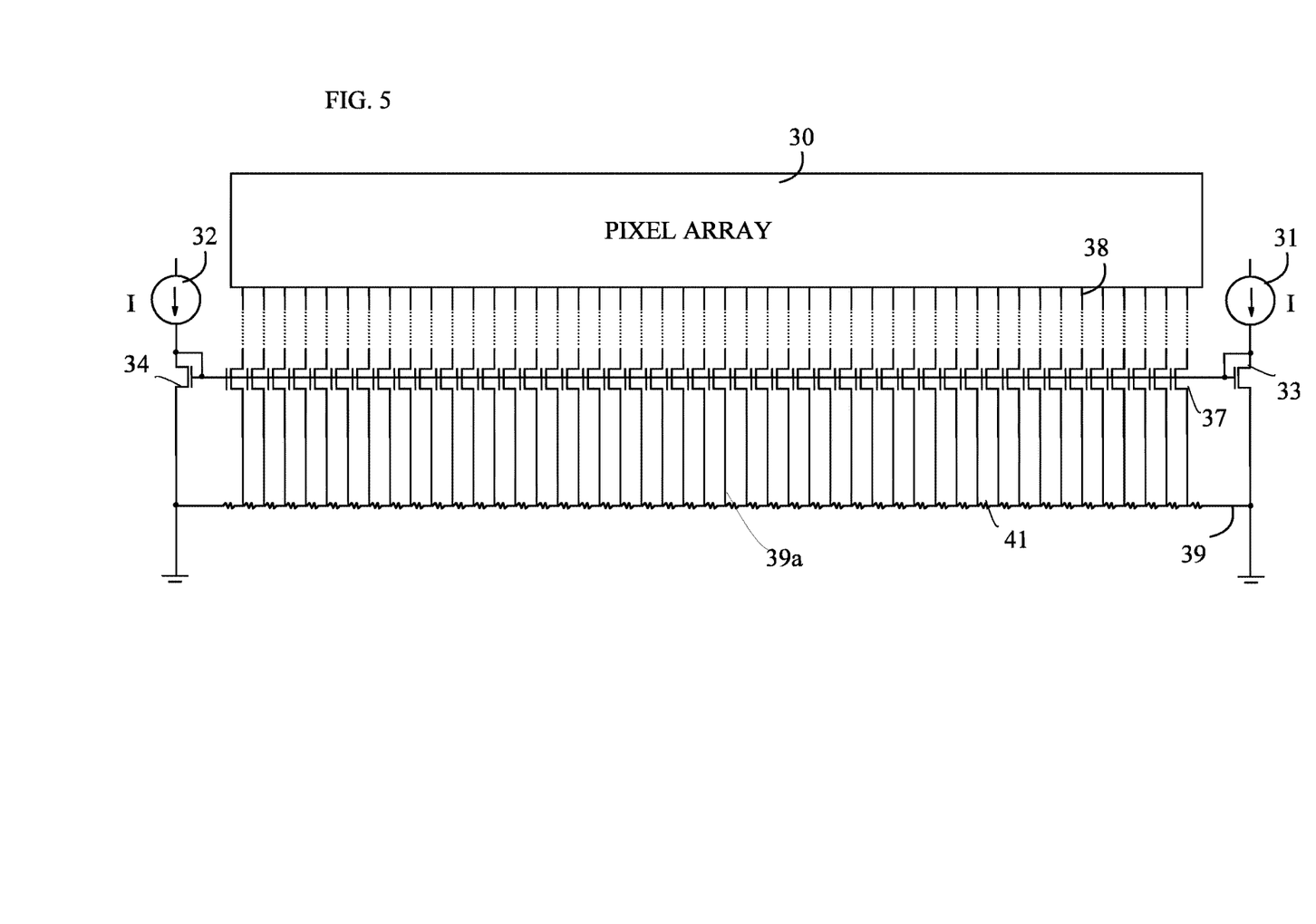
FIG. 5 illustrates a bit line biasing scheme having two master currents.

One method for mitigating these problems is to include a second current master at the other end of the imaging array. Refer now to FIG. 5, which illustrates a bit line biasing scheme having two master currents. The imaging array in FIG. 5 differs from that shown in FIG. 3 in that a second master current source 32 has been added to the other end of the bit line array and a second FET 34 provides a second connection to the embedded FETs in the bit lines. This arrangement reduces the variation in the potential at node 47 discussed above by a factor of two; however, for large imaging arrays, the variation in potential is still problematic.

In principle, the value of resistor 46 could be reduced by increasing the cross-sectional area of conductor 39 shown in FIG. 5. However there are limits to the level of improvement that can be obtained by such an approach. Conductor 39 is preferably implemented using the layers overlying the silicon substrate in which the photodiodes and transistors are constructed. The thickness of these layers is set by the fabrication process, and hence, decreasing the resistance of the conducting segments would require substantially increasing the width of the conductors formed in these layers. In imaging chip designs in which the image is projected onto the same side of the substrate that contains the metal layers, substantially increasing the width of the metal layers without limiting the fill factor of the imaging array poses significant challenges.

Refer again to FIG. 5. Denote the number of bit lines by N and the resistance of each of the conducting segments 41 by Rm. It can be shown that the difference in voltage between node 39a at the center of the array of bit lines and node 39 is given by $$V(39a)=(\tfrac{1}{2})*(N*I*Rm) \tag{1}$$

Here, I is the bias current flowing in each bit line. Hence, voltage at node 47 shown in FIG. 4 is higher at the center of the array than on the edges of the array. To compensate for this mismatch, the bit-line bias currents must all be increased so that the center bit line maintains the minimum current needed to compensate for the current reduction due to the higher voltage at node 39a at the center of the array. This increased power represents a significant increase in the power needed for an image sensor.

In one embodiment of a biasing network according to the present disclosure, the bit lines are divided into groups. The bit lines in each group are connected to a common bus and that bus is connected to a ground terminal, a conducting path that is characterized by a "ground path" resistance. In this embodiment, the ground path resistance of each of the conducting paths is substantially the same as the other ground path resistances. Hence, the maximum variation in potential between the ends of the bit lines in a group is determined by the number of bit lines in the group rather than the number of bit lines in the imaging array.

In one exemplary embodiment, the bit lines in each group are connected to a leaf node, a tree structured conductor having a root node connected to the ground terminal. The potential at each leaf node is substantially the same as the potential at the other leaf nodes of the tree. Hence, the variations in potential at the ends of the bit lines in each group are substantially reduced relative to the variation in potential between the center bit line and the edge bit lines shown in FIG. 5.

Figure 6:
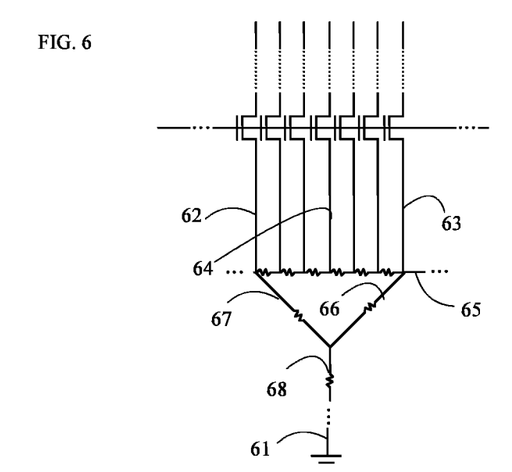
FIG. 6 illustrates a group of seven bit lines connected to the leaf nodes of a tree configured network.

Refer now to FIG. 6, which illustrates a group of seven bit lines connected to the leaf nodes of a tree of the type discussed above. All of the bit lines are connected to a common conductor 65 which has a non-zero resistivity as indicated by the resistors. The bit lines at the edges of the group are shown at 62 and 63. The bit line at the center of the group is shown at 64. Bit line 62 is connected to a leaf node 67 of the tree, and bit line 63 is connected to a second leaf node 66 of the tree. The leaf nodes of the tree eventually connect to a root node 61 that terminates at a ground contact. The path to the ground contact has a non-zero resistance as indicated by resistor 68. The various conductors in the tree are formed in metal layers that have nonzero resistivities as indicated by the resistors shown in the conductors. It should be noted that the potentials at 66 and 67 are above ground due to the finite current flowing through the tree. However, the potentials at 66 and 67 are substantially the same. Accordingly, the increase in the potential on bit line 64 relative to bit line 62 is given by Eq. (1), where N is now the number of bit lines in the group.

Figure 7:
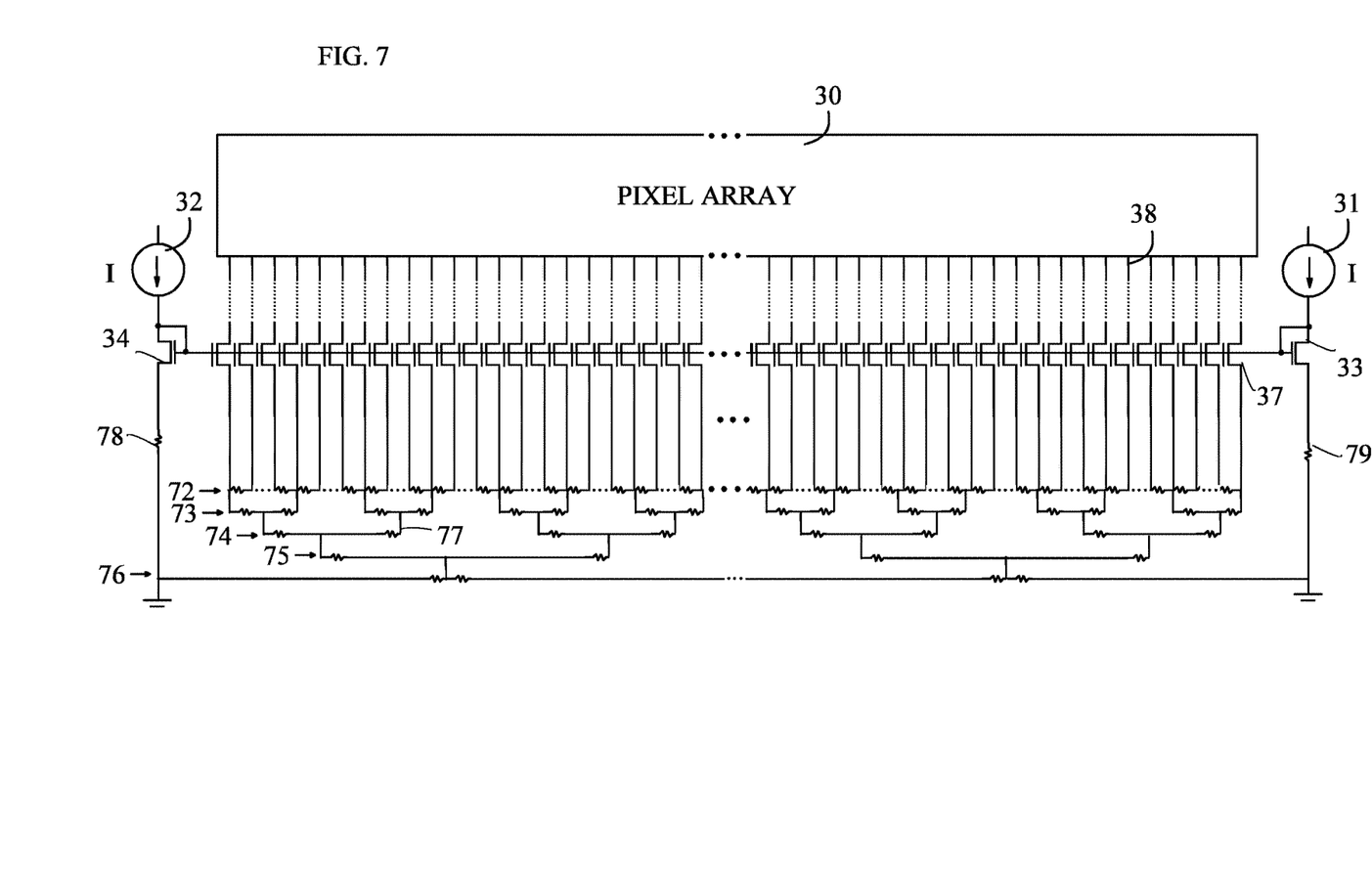
FIG. 7 illustrates an embodiment of a bit line bias scheme in which the tree-structured conductors are fabricated in the metal layers overlying the silicon substrate in which the imaging array is fabricated.

Refer now to FIG. 7, which illustrates an embodiment of a bit line bias scheme in which the tree-structured conductors are fabricated in the metal layers overlying the silicon substrate in which the imaging array is fabricated. In this example, there are four metal layers that can be used to construct the tree, namely, layers 73-76. The common bus to which all of the bit lines are connected is constructed in metal layer 72. Since there are four remaining layers, the bias scheme divides the bit lines into 16 groups. A "group" can be defined as the bit lines between two leaf nodes or the bit lines on each side of a single node.

The nodes in each conductor are constructed by conducting vias between the metal layers. Via 77 is an example of such a conducting via. The resistance of a conducting via is substantially less than the resistance in the metal lines, and hence, is ignored in the following discussion.

The tree introduces additional resistance between the transistor of the current mirror in each bit line and the ground contact. The tree structure significantly reduces the variations in this resistance as a function of bit line position in the array of bit lines. To compensate for this additional resistance, compensating resistors 78 and 79 are introduced into the current source paths.

The resistance of the compensating resistors is determined to provide the same voltage drop in the current source path as the voltage drop from one leaf node of the tree to the ground contact. The resistance from a leaf node to the ground node in this example is $15.5*n*Rm$, where n is the number of nodes in a group. In the present example, $n=N/16$. Hence, the resistance between the leaf node and the ground contact is $RL=(15.5/16)NRm$. In one embodiment, the current in the source paths is the same as the bias current in the bit lines, and the compensating resistors have resistances substantially equal to RL. If the bias current in the bit lines is not equal to the current in the source paths, the resistances are increased or decreased accordingly.

This embodiment ignores the variation in resistance between a bit line in the group and the leaf node associated with that group. That resistance varies from 0 to $n/2*Rm$. In another exemplary embodiment, the compensating resistors are increased by the average of this additional resistance. In the example shown in FIG. 7, $n=N/16$, and hence the average additional resistance is only about NRm/32. Hence, this additional resistance can be ignored in many cases.

For the purposes of this disclosure, the voltages between the bit lines and the ground contact are defined to be substantially equal to the voltages across the compensation resistors if the variations in voltages between individual bit lines in a group are no more than $n/2*Rm$ times the bias current flowing through the bit line.

While the above-described embodiments are directed towards the constant current biasing requirements of the imaging array, a resistive network analogous to the networks discussed above can also be advantageously used to provide the voltages to the other end of the bit lines. Refer again to FIG. 2. The other end of bit line 19 must be connected to a voltage source that maintains a voltage of Vb on each of the bit lines during the readout of the image. Each of the bit lines is typically connected to a power rail that is constructed in one of the metal layers. The power rail must extend over the width of the imaging array in the same manner as the ground rail extended over the width of the imaging array in the above-described embodiments. The power rail has a non-zero resistivity, and hence, the voltage presented at the end of each of the bit lines will vary as a function of the bit line location in the imaging array during readout when each bit line is conducting the constant current discussed above.

Figure 8:
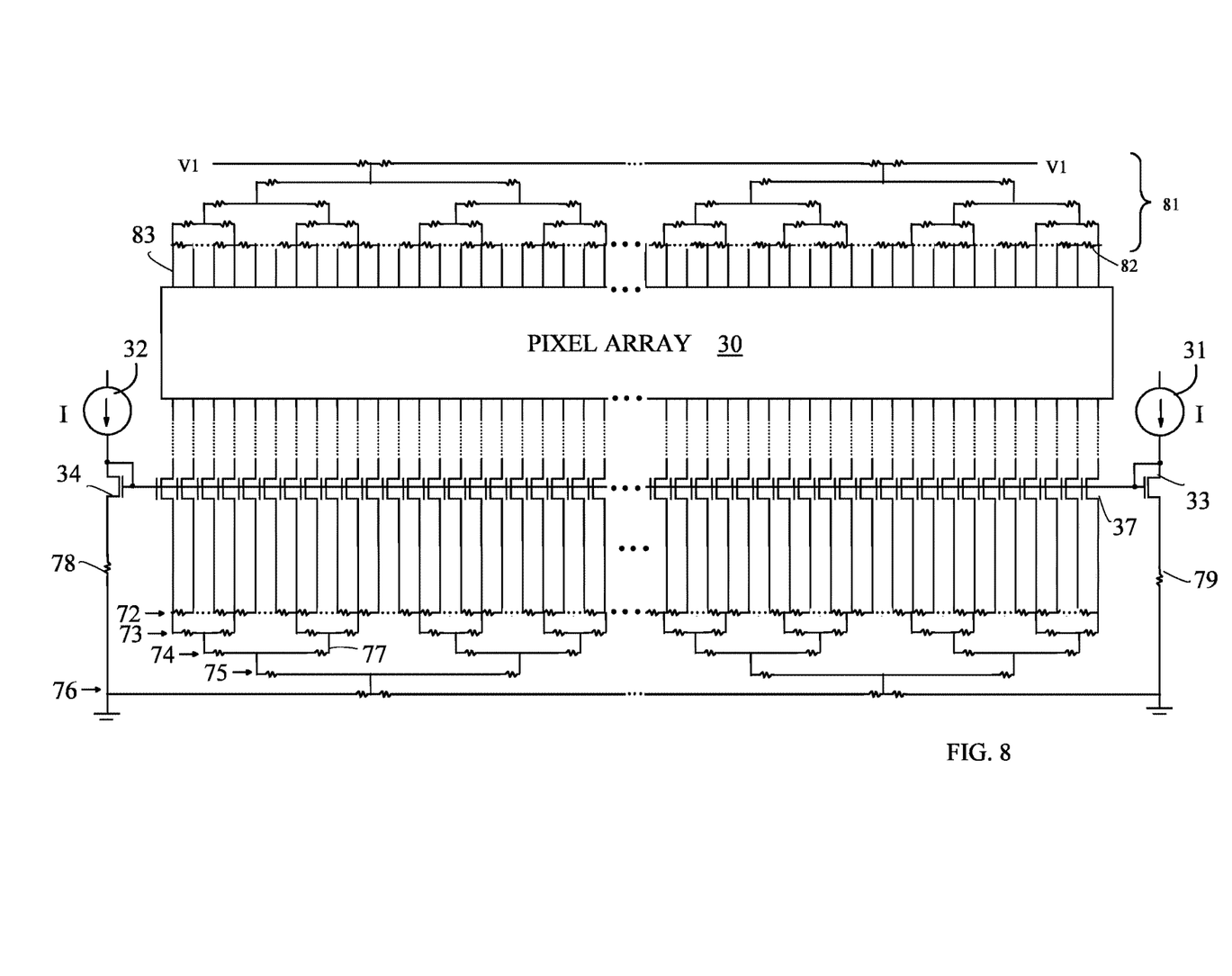
FIG. 8 illustrates an imaging array in which the power distribution network utilizes a tree-configured conductor system for the ground distribution system.

Refer now to FIG. 8, which illustrates an imaging array in which the power distribution network utilizes a tree-configured conductor system analogous to that described above for the ground distribution system. In this exemplary embodiment, each of the tops of the bit lines from imaging two-dimensional pixel array 340 are connected to a power contact having a voltage V1 by a tree-configured conductor network 81 that is constructed in the metal layers over the selected substrate in which the photodiodes are constructed. The bit lines terminate on a conductor 82 that has a non-zero resistance and is constructed in one of the metal layers. A typical bit line is labeled at 83. The bit lines are divided into groups, and each group is connected to a conductor that connects that group to one of the voltage contacts supplying voltage V1. The resistance of each of these conductors between conductor 82 and the voltage contact is substantially same. The voltage, V1, is chosen such that the voltage drop across that resistance compensates for the difference between V1 and the bit lines.

The distribution networks described above provide significant improvements in situations in which the conducting paths between the bit lines have an impedance that is greater than a critical impedance. The critical impedance is defined to be that impedance at which the performance of the imaging array is substantially reduced in terms of the power required to operate the imaging array, the maximum photocharge that can be measured by the imaging array, or the maximum variation in photocharge that can be tolerated from bit line to bit line.

While the above-described embodiments have all of the bit lines connected to the power bus, embodiments in which only a sub-set of the bit lines are attached to the power bus can be advantageously implemented. For example, some of the bit lines could be connected to another power bus because of specific design considerations. Such embodiments still contain power distribution network according to the present disclosure.

The above-described embodiments have been provided to illustrate various aspects of a power distribution network. However, it is to be understood that different aspects of the power distribution network that are shown in different specific embodiments can be combined to provide other embodiments of a power distribution network. In addition, various modifications to the power distribution network will become apparent from the foregoing description and accompanying drawings. Accordingly, the power distribution network is to be limited solely by the scope of the following claims.

What is claimed is:

1. An apparatus comprising:
a plurality of bit lines, each of said plurality of bit lines being connected to a different location on a first power bus, said first power bus being divided into a plurality of first conducting segments, each of said plurality of first conducting segments being connected to a plurality of said bit lines, each bit line comprising a constant current source that causes a bias current to flow in said bit line and through said first power bus; and
a first power connection network comprising a plurality of first conducting paths, one of said plurality of first conducting paths connecting a corresponding one of said plurality of first conducting segments to a first power rail and being characterized by a path resistance that is greater than a critical impedance.

2. The apparatus of claim 1 comprising an imaging array having a plurality of columns of pixel sensors, each pixel sensor in one of said plurality of columns of pixel sensors being connected to one of said bit lines that is shared by all pixel sensors in that column.

3. The apparatus of claim 1 wherein said path resistances are substantially equal to one another.

4. The apparatus of claim 1 wherein said first power connection network comprises a tree-configured network having a leaf node connected to one of said plurality of first conducting segments and a root node connected to said first power rail.

5. The apparatus of claim 2 wherein said pixel sensors are part of a semiconductor to wafer underlying a plurality of metal layers and wherein said first power connection network comprises conductors in a plurality of said metal layers.

6. The apparatus of claim 1 further comprising a calibration current path comprising a master current source that generates a calibration current in a first half of a current mirror, said constant current sources in said bit lines comprising a second half of said current mirror.

7. The apparatus of claim 6 wherein said calibration current path comprises a compensation resistor in series with said first half of said current mirror, said compensation resistor compensating for said path resistance.

8. The apparatus of claim 7 wherein said compensation resistor has a resistance chosen such that a voltage drop over said compensation resistor is substantially equal to a voltage drop over said path resistance when a current flows in said first half of said current mirror.

9. The apparatus of claim 1 wherein each of said bit lines comprises a first power connection connected to said first power bus and a second power connection at a different location on that bit line than said first power connection, said second power connection being connected to a second power bus divided into a plurality of second conducting segments, said apparatus further comprising a second power connection network comprising a plurality of conducting paths connecting a corresponding one of said second conducting segments to a second power rail and being characterized by a path resistance that is greater than a critical impedance.

10. The apparatus of claim 9 wherein said plurality of conducting paths of said second power connection network are characterized by impedances that are substantially equal to one another.

11. The apparatus of claim 9 wherein said second power rail has a voltage that compensates for a voltage drop through said second power connection network due to said bias currents in said bit lines.

12. The apparatus of claim 1 further comprising one or more bit lines that are not connected to said first power bus.

* * * * *